United States Patent
Shinosaka

(10) Patent No.: US 9,641,040 B2
(45) Date of Patent: May 2, 2017

(54) ROTATING ELECTRIC MACHINE

(75) Inventor: Yoshihiro Shinosaka, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 385 days.

(21) Appl. No.: 14/358,312

(22) PCT Filed: Feb. 16, 2012

(86) PCT No.: PCT/JP2012/053649
§ 371 (c)(1),
(2), (4) Date: May 15, 2014

(87) PCT Pub. No.: WO2013/121555
PCT Pub. Date: Aug. 22, 2013

(65) Prior Publication Data
US 2014/0312727 A1    Oct. 23, 2014

(51) Int. Cl.
*H02K 5/16* (2006.01)
*H02K 5/173* (2006.01)
*F16C 35/077* (2006.01)
*F16C 19/52* (2006.01)
*F16C 19/06* (2006.01)

(52) U.S. Cl.
CPC ........... *H02K 5/161* (2013.01); *F16C 35/077* (2013.01); *H02K 5/1732* (2013.01); *F16C 19/06* (2013.01); *F16C 19/525* (2013.01)

(58) Field of Classification Search
CPC ...... H02K 5/173; H02K 5/161; F16C 35/077; F16C 19/525; F16C 19/06
USPC ........................................................ 310/90
See application file for complete search history.

(56) References Cited

U.S. PATENT DOCUMENTS

| | | | |
|---|---|---|---|
| 3,749,463 A | 7/1973 | Krapf | |
| 5,043,614 A * | 8/1991 | Yockey | ................ H01L 25/115 257/E25.026 |

(Continued)

FOREIGN PATENT DOCUMENTS

| | | |
|---|---|---|
| DE | 8911295 U1 | 3/1991 |
| DE | 4408624 A1 | 9/1995 |
| EP | 0 940 593 B1 | 9/1999 |

(Continued)

OTHER PUBLICATIONS

Communication dated Aug. 28, 2015 from the European Patent Office in counterpart application No. 12868708.4.

(Continued)

*Primary Examiner* — Burton Mullins
(74) *Attorney, Agent, or Firm* — Sughrue Mion, PLLC; Richard C. Turner

(57) ABSTRACT

Provided is a rotating electric machine capable of preventing an outer race of a bearing from rotating because of a reduction in force for coupling a bearing housing portion and the outer race of the bearing. A resin case (24) uses thermal expansion to fill a clearance between the bearing housing portion and the outer race of a counter-driving side bearing. A hook (25) projecting inward in a radial direction is formed at least at one position on a circumferential edge portion of the resin case (24) on a side opposite to a rotor. The bearing housing portion includes a concave portion to which the hook (25) is to be locked, which is formed on a flange portion inside of which a shaft passes.

9 Claims, 4 Drawing Sheets

(56) References Cited

U.S. PATENT DOCUMENTS

| | | | |
|---|---|---|---|
| 5,947,612 | A | 9/1999 | Dennison Buck et al. |
| 2004/0160138 | A1 | 8/2004 | Kuroda et al. |

FOREIGN PATENT DOCUMENTS

| | | | |
|---|---|---|---|
| JP | 2-51714 | U | 4/1990 |
| JP | 5-70157 | U | 9/1993 |
| JP | 7-158647 | A | 6/1995 |
| JP | 2000-156952 | A | 6/2000 |
| JP | 2002-125346 | A | 4/2002 |
| JP | 2006-57676 | A | 3/2006 |
| JP | 3983690 | B2 | 9/2007 |
| WO | 86/05633 | A1 | 9/1986 |
| WO | 01/31211 | A1 | 5/2001 |

OTHER PUBLICATIONS

International Search Report for PCT/JP2012/053649 dated Apr. 3, 2012.

* cited by examiner

ROTATING ELECTRIC MACHINE

TECHNICAL FIELD

The present invention relates to a rotating electric machine such as an AC generator to be mounted in a vehicle, in particular, a rotating electric machine including a bearing for supporting a rotor, which is housed inside a bearing housing portion of a bracket.

BACKGROUND ART

Conventionally, as an AC generator for a vehicle, there is known an AC generator including a driving side bearing and a counter-driving side bearing provided on both sides of a shaft so as to rotationally support a rotor, in which the driving side bearing is directly press-fitted into a driving side bracket and is fixed to the driving side bracket by fastening a retainer with a screw (for example, see Patent Literature 1).

In the above-mentioned AC generator for a vehicle, instead of being fixed to the counter-driving side bracket by using the retainer, the counter-driving side bearing is housed inside a bearing housing portion of the counter-driving side bracket through a band made of a resin provided on an outer circumferential surface of an outer race portion therebetween so as to prevent a force for coupling the bearing housing portion and the bearing from being lowered by a difference in thermal expansion therebetween, which is generated by heat generation occurring when the AC generator for a vehicle is driven. In this manner, the outer race of the bearing is prevented from rotating with respect to the bearing housing portion by a friction force of the band.

CITATION LIST

Patent Literature

[PTL 1] JP 2002-125346 A (FIG. 6, paragraphs [0029] and [0031])

SUMMARY OF INVENTION

Technical Problem

In the case of the above-mentioned AC generator for a vehicle, however, a groove portion is required to be formed on the outer circumferential surface of the outer race of the bearing so as to dispose the band made of a resin for preventing the rotation of the outer race of the bearing therein. Therefore, there is a problem in that the bearing becomes a special bearing to increase manufacturing costs, which in turn increases costs of the AC generator for a vehicle.

The present invention has been made to solve the problem described above, and therefore has an object of providing a rotating electric machine which is capable of preventing a bearing housing portion from being broken by preventing an outer race of a bearing from rotating because of a reduction in force for coupling the bearing housing portion and the bearing due to a difference in thermal expansion between the bearing housing portion and the bearing, which is generated by heat generation occurring at the time of driving of the rotating electric machine by press-fitting the bearing into the bearing housing portion through a clearance filling member having a cylindrical shape therebetween, to therefore enable cost reduction without the need of using a special bearing, and is also capable of preventing the clearance filling member from coming out of the bearing housing portion and from rotating.

Solution to Problem

According to one embodiment of the present invention, there is provided a rotating electric machine, including:
a shaft;
a rotor fixed to the shaft;
bearings for supporting the rotor, which are provided rotatably to the shaft on both sides of the rotor; and
brackets including bearing housing portions into which the bearings are respectively press-fitted, the bearing being press-fitted into the bearing housing portion through a clearance filling member having a cylindrical shape therebetween,
in which the clearance filling member uses thermal expansion to fill a clearance between the bearing housing portion and an outer race of the bearing, which is generated by a difference in thermal expansion between the bearing housing portion and the outer race of the bearing due to heat generation at time of driving, the clearance filling member including a hook projecting inward in a radial direction and formed at least at one position on a circumferential edge portion thereof on a side opposite to the rotor, and
in which the bearing housing portion includes a concave portion to which the hook is to be locked, the concave portion being formed on a flange portion inside of which the shaft passes.

Advantageous Effects of Invention

According to the rotating electric machine according to one embodiment of the present invention, the clearance filling member includes the hook projecting inward in the radial direction, which is formed at least at one position on the circumferential edge portion of the clearance filling member on the side opposite to the rotor. The bearing housing portion includes the concave portion to which the hook is locked, which is formed on the flange portion of the bearing housing portion, inside of which the shaft passes. Therefore, the outer race of the bearing is prevented from rotating due to the heat generation at the time of driving of the rotating electric machine to enable the prevention of breakage of the bearing housing portion.

Therefore, a special bearing is not required to be used, and hence costs can be reduced. Moreover, the clearance filling member neither comes out of the bearing housing portion nor rotates.

DESCRIPTION OF EMBODIMENTS

Referring to the accompanying drawings, embodiments of the present invention are described below. In the description, the same or corresponding components and parts of the drawings are denoted by the same reference symbols.

First Embodiment

Figure 1:
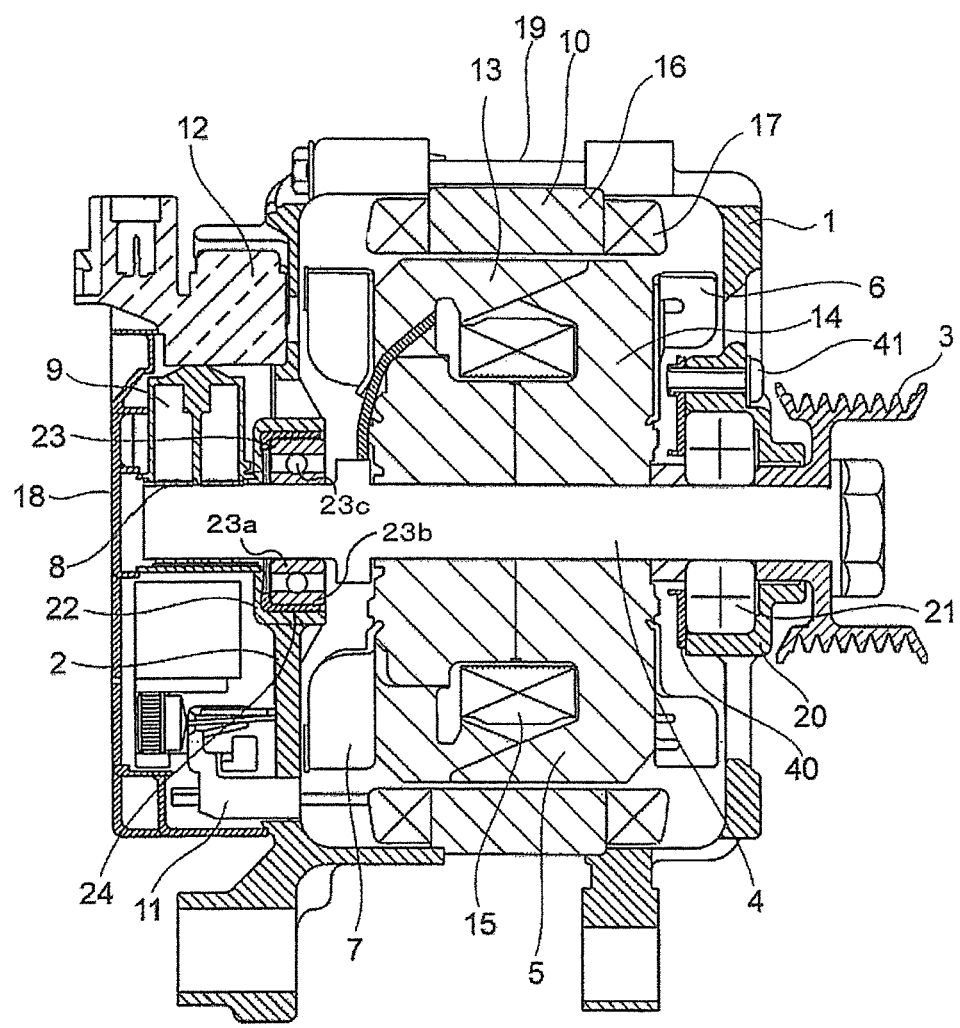
FIG. 1 is a sectional side view illustrating an AC generator for a vehicle according to a first embodiment of the present invention.

FIG. 1 is a sectional side view illustrating an AC generator for a vehicle according to a first embodiment of the present invention.

The AC generator for a vehicle (hereinafter abbreviated as "generator") includes a case composed of a driving side bracket 1 and a counter-driving side bracket 2, a resin cover 18 which covers the entire surface of the counter-driving side bracket 2, a shaft 4 having one end to which a pulley 3 is mounted, which is provided inside of the case, a rotor 5 mounted to the shaft 4, a driving side fan 6 mounted to the driving side bracket 1 side of the rotor 5, and a counter-driving side fan 7 mounted to the counter-driving side bracket 2 side.

The generator also includes a slip ring 8 mounted to the shaft 4, for supplying a current to the rotor 5, a pair of brushes 9 which slides on the slip ring 8, a stator 10 fixed to the driving side bracket 1 and the counter-driving side bracket 2, a rectifier 11 electrically connected to the stator 10, for rectifying an AC current generated in the stator 10 into a DC current, and a regulator 12 for regulating an AC voltage generated in the stator 10.

The rotor 5 includes a pair of claw-like magnetic poles 13 and 14 which are opposed to each other and a rotor coil 15 formed by winding a conductor, which is provided inside the claw-like magnetic poles 13 and 14.

The stator 10 includes a stator core 16, and a stator coil 17 formed by winding a conductor in a slot (not shown) of the stator core 16. The stator coil 17 includes two three-phase AC windings, each being formed by connecting three winding portions (not shown) in a three-phase Y form.

Each of the driving side bracket 1 and the counter-driving side bracket 2 is made of aluminum and is formed in a bowl-like shape. Opening portions of the respective bowl shapes are provided so as to be opposed to each other and fastened with a fastening bolt 19, thereby integrating the driving side bracket 1 and the counter-driving side bracket 2 into one.

A bearing housing portion 20 is formed in a center portion of the driving side bracket 1. A driving side bearing 21 which rotatably supports the shaft 4 is press-fitted into and housed inside the bearing housing portion 20. The driving side bearing 21 is fixed to the driving side bracket 1 by fastening a retainer 40 by a screw 41.

A bearing housing portion 22 is formed in a center portion of the counter-driving side bracket 2. A counter-driving side bearing 23 which rotatably supports the shaft 4 is press-fitted into the bearing housing portion 22 through a resin case 24 which is a clearance filling member therebetween. The counter-driving side bearing 23 includes an inner race 23a firmly fixed to the shaft 4, an outer race 23b fixed inside the bearing housing portion 22 through the resin case 24 therebetween, and balls 23c mounted between the outer race 23b and the inner race 23a.

The resin case 24 uses thermal expansion to fill a clearance between the bearing housing portion 22 and the outer race 23b of the counter-driving side bearing 23, which is generated by a difference in thermal expansion between the bearing housing portion 22 and the outer race 23b of the counter-driving side bearing 23 due to heat generation occurring at the time of driving.

Figure 2:
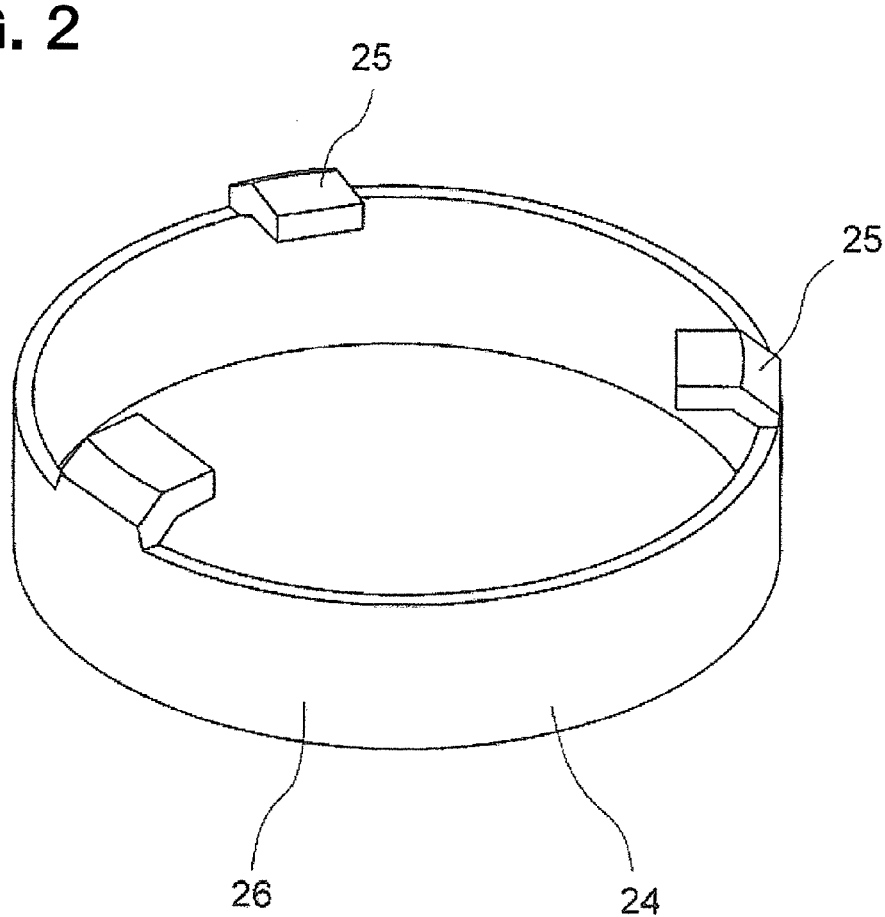
FIG. 2 is a perspective view illustrating the resin case 24 illustrated in FIG. 1.

FIG. 2 is a perspective view illustrating the resin case 24 illustrated in FIG. 1.

The resin case 24 illustrated in FIG. 2 has a cylindrical shape which covers the entire axial length of the outer race 23b of the counter-driving side bearing 23, and is made of a polybutyleneterephthalate (PBT) resin.

Hooks 25 are formed equiangularly on an edge portion of the resin case 24, which is on the side opposite to the rotor 5. The hooks 25 project from an end surface of a case main body 26 in the axial direction and also project inward in a radial direction.

Figure 3:
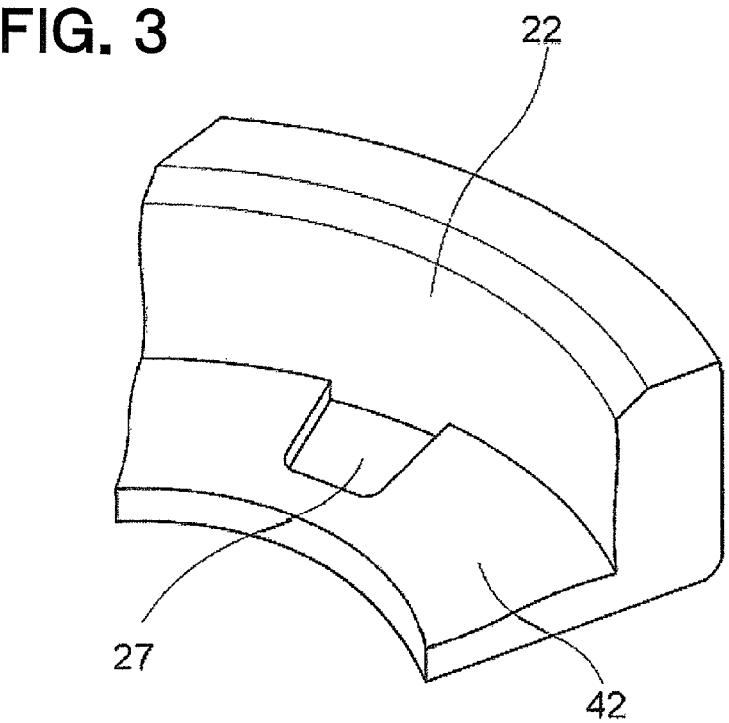
FIG. 3 is a fragmentary perspective view of the bearing housing portion in FIG. 1 as viewed from an inner side.
Figure 4:
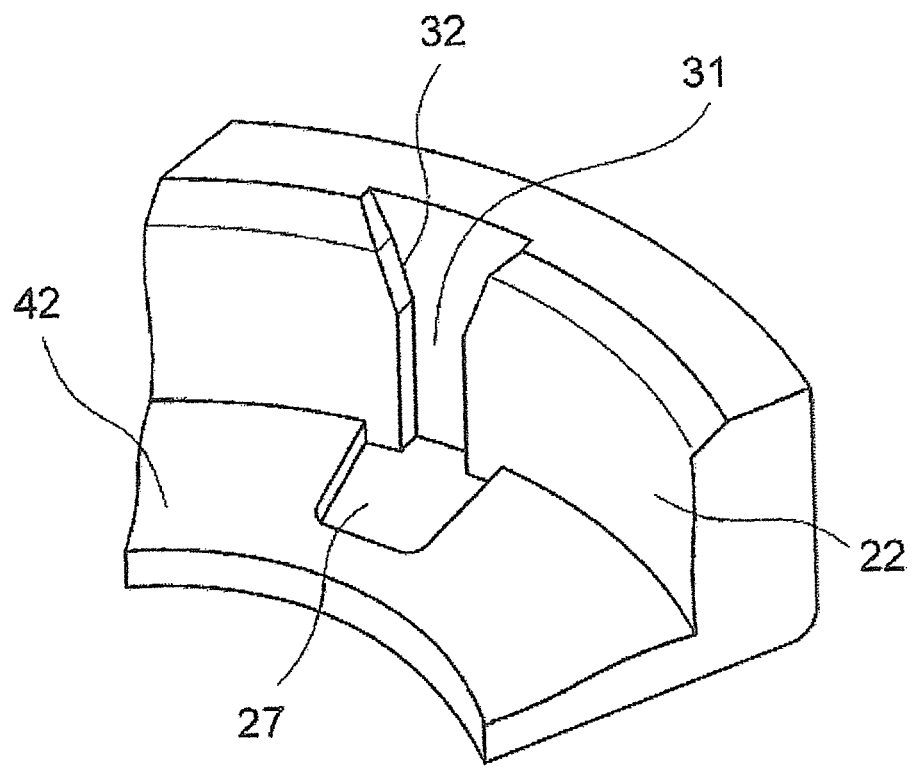
FIG. 4 is a fragmentary perspective view of the bearing housing portion in FIG. 1 as viewed from an outer side.

FIG. 3 is a fragmentary perspective view of the bearing housing portion 22 of the counter-driving side bracket 2 as viewed from an inner side, and FIG. 4 is a fragmentary perspective view of the bearing housing portion 22 as viewed from an outer side.

Concave portions 27, to which the hooks 25 are locked, are formed on a flange portion 42 of the bearing housing portion 22, inside of which the shaft 4 passes. Projecting portions 28 are formed on an outer side of the flange portion 42 so as to correspond to the concave portions 27.

In the generator having the configuration described above, a current is supplied from a battery (not shown) through brushes 9 and the slip ring 8 to the rotor coil 15 of the rotor 5 to generate a magnetic flux. As a result, the N-pole and the S-pole are respectively generated in the claw-like magnetic poles 13 and 14 of the rotor 5.

On the other hand, the pulley 3 is driven by an engine. Then, the rotor 5 is rotated by the shaft 4. Therefore, a rotating magnetic field is applied to the stator core 16 to generate an electromotive force in the stator coil 17.

A magnitude of the AC electromotive force is regulated by the regulator 12 which regulates the current flowing through the rotor coil 15.

An AC generated by the AC electromotive force passes through the rectifier 11 to be rectified into a DC to charge a battery.

The counter-driving side bearing 23 is housed inside the bearing housing portion 22 of the counter-driving side bracket 2 on which the rectifier 11 and the regulator 12 corresponding to heat-generating components are provided.

Therefore, the heat generated from the heat-generating components is transferred through the bearing housing portion 22 on the counter-driving side to the counter-driving side bearing 23. Moreover, heat generated from the rotor coil 15 is transferred through the claw-like magnetic poles 13 and 14 to the shaft 4. The heat is then transferred to the outer race 23b of the counter-driving side bearing 23, resulting in thermal expansion of the bearing housing portion 22, the resin case 24, and the outer race 23b of the counter-driving side bearing 23.

The bearing housing portion 22 is formed of aluminum, whereas the outer race 23b of the counter-driving side bearing 23 is formed of carbon steel. Therefore, at the time of thermal expansion, the thermal expansion occurs so as to increase a gap between the bearing housing portion 22 and the outer race 23b of the counter-driving side bearing 23.

On the other hand, having a large linear expansion coefficient, the resin case 24 thermally expands so as to fill an increase in the gap between the bearing housing portion 22 and the outer race 23b of the counter-driving side bearing 23. Therefore, a force for coupling the bearing housing portion 22 and the outer race 23b of the counter-driving side bearing 23 through the resin case 24 therebetween is ensured.

The resin case 24 is locked to the concave portions 27 of the bearing housing portion 22 by the hooks 25 formed on the edge portion. Therefore, the rotation of the resin case 24 itself can be prevented.

Moreover, the hooks 25 are locked onto a side surface of the outer race 23b of the counter-driving side bearing 23 with their distal end portions being oriented inward in the radial direction. Thus, the resin case 24 neither comes out of the bearing housing portion 22 nor rotates.

Moreover, the driving side bracket 1 and the counter-driving side bracket 2 have a reduced thickness for lighter weight. Therefore, although the projecting portions 28 are formed on a surface of the flange portion 42, which is on the back side of the surface of the flange portion 42 on which the concave portions 27 are formed, the projecting portions 28 are formed on only a part thereof, that is, at three positions. Thus, the projecting portions scarcely inhibit the passage of cooling air.

Further, the concave portions 27 formed on the flange portion 42 are not holes. Therefore, water or a foreign substance does not enter through the concave portion 27 to degrade performance and durability.

Further, the resin case 24 is provided over the entire axial length of the outer race 23b of the counter-driving side bearing 23. Therefore, the rotation of the outer race 23b of the counter-driving side bearing 23, which is caused due to the heat generation at the time of driving of the generator, can be more reliably prevented.

Further, the plurality of hooks 25 are formed equiangularly. Therefore, the resin case 24 is stably housed inside the bearing housing portion 22. At the same time, the rotation of the resin case 24 itself can be more reliably prevented.

Second Embodiment

Figure 5:
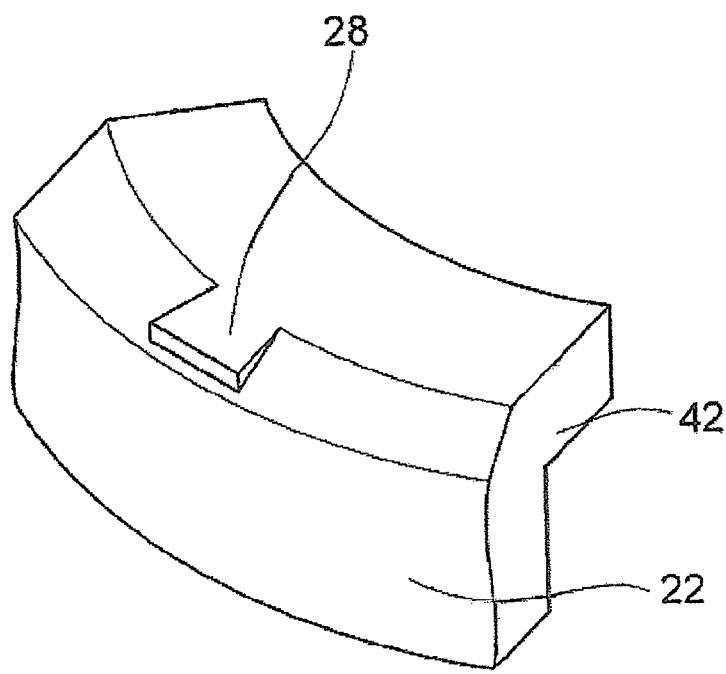
FIG. 5 is a fragmentary perspective view illustrating the resin case of an AC generator for a vehicle according to a second embodiment of the present invention.
Figure 6:
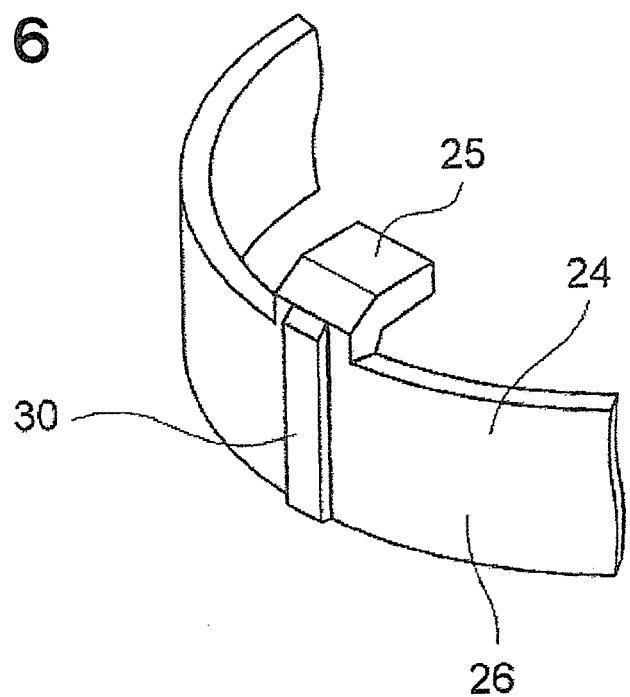
FIG. 6 is a fragmentary perspective view illustrating an inner side of the bearing housing portion of the AC generator for a vehicle illustrated in FIG. 5.

FIG. 5 is a fragmentary perspective view illustrating the resin case 24 of an AC generator for a vehicle according to a second embodiment of the present invention, and FIG. 6 is a fragmentary perspective view illustrating an inner side of the bearing housing portion 22 of the AC generator for a vehicle illustrated in FIG. 5.

In this embodiment, ribs 30 having distal end portions respectively connected to the hooks 25 are formed on an outer circumferential surface of the case main body 26 of the resin case 24 to extend in the axial direction over its entire width.

On the other hand, the concave portions 27, to which the hooks 25 are locked, are formed on the flange portion 42 of the bearing housing portion 22, inside of which the shaft 4 passes. The flange portion 42 includes projecting portions (not shown) formed on the outer side so as to correspond to the concave portions 27.

On the inner circumferential surface of the bearing housing portion 22, rib receiving portions 31, which have distal end portions respectively connected to the concave portions 27 and extend in the axial direction, are formed. A tapered cutout portion 32 is formed at an inlet portion of each of the rib receiving portions 31.

The remaining configuration is the same as that of the AC generator for a vehicle according to the first embodiment.

In this embodiment, the ribs 30 having the distal end portions respectively connected to the hooks 25 are formed on the circumferential surface of the resin case 24. Therefore, strength of each of the hook 25 and the resin case 24 is increased.

Moreover, the rib receiving portions 31 for receiving the ribs 30 function together with the cutout portions 32 as insertion guides at the time of assembly of the resin case 24 to the bearing housing portion 22.

Further, the resin case 24 thermally expands when heated and contracts when a temperature is lowered. As a result, the inner circumferential surfaces of portions on which the ribs 30 are formed project toward the inner circumferential side. Moreover, the outer circumferential portions located between the portions on which the ribs 30 are formed project toward the outer circumferential side. As a result, the resin case 24 is deformed in a non-true circle shape. In this manner, a configuration having a force for retaining the outer race 23b of the counter-driving side bearing 23 is provided. The above-mentioned configuration has a function of preventing the outer race 23b from rotating, and further preventing the resin case 24 from rotating.

The ribs 30 are not required to be formed over the entire width of the resin case 24 in the axial direction. The ribs 30 may be formed only over a part of the entire width in the axial direction so that the inner circumferential portion or the outer circumferential portion of the resin case 24 projects to come into engagement with the outer race 23b or the bearing housing portion 22 to prevent of the resin case 24 and the outer race 23b from turning.

Moreover, although the AC generator to be applied to the AC generator for a vehicle has been described in the above-mentioned embodiments, as a matter of course, the present invention is not limited thereto, and is also applicable to, for example, an AC generator for an outboard engine.

Further, the present invention is also applicable to an electric motor.

Further, the present invention is also applicable to a motor generator which functions both as an electric motor and a generator.

Further, although the case where the resin is used as the material of the clearance filling member has been described, a metal may be used instead.

The invention claimed is:

1. A rotating electric machine, comprising:
a shaft;
a rotor fixed to the shaft;
bearings for supporting the rotor, which are provided rotatably to the shaft on both sides of the rotor; and
brackets comprising bearing housing portions into which the bearings are respectively press-fitted, the bearing being press-fitted into the bearing housing portion through a clearance filling member having a cylindrical shape therebetween,
wherein the clearance filling member uses thermal expansion to fill a clearance between the bearing housing portion and an outer race of the bearing, which is generated by a difference in thermal expansion between the bearing housing portion and the outer race of the bearing due to heat generation at time of driving, the clearance filling member comprising a hook projecting inward in a radial direction and formed at least at one position on a circumferential edge portion thereof on a side opposite to the rotor, and
wherein the bearing housing portion comprises a concave portion to which the hook is to be locked, the concave portion being formed on a flange portion inside of which the shaft passes.

2. The rotating electric machine according to claim 1, wherein the clearance filling member is provided over an entire axial length of the outer race of the bearing.

3. The rotating electric machine according claim 1,
wherein the clearance filling member comprises a rib formed on an outer circumferential surface thereof, the rib having a distal end portion connected to the hook and extending in an axial direction, and
wherein the bearing housing portion comprises a rib receiving portion for receiving the rib therein, which is formed on an inner circumferential surface thereof.

4. The rotating electric machine according to claim 3, wherein the rib receiving portion comprises a tapered cutout portion enlarging toward an opening side, which is formed at an inlet portion thereof.

5. The rotating electric machine according to claim 1, wherein the flange portion comprises a projecting portion formed on a surface on a back side of a surface on which the concave portion is formed.

6. The rotating electric machine according to claim 1, wherein the hook comprises a plurality of hooks formed equiangularly.

7. The rotating electric machine according to claim 1,
wherein the rotating electric machine comprises an AC generator for a vehicle, and
wherein the bracket comprises a counter-driving side bracket to which a rectifier and a regulator are provided.

8. The rotating electric machine according to claim 1, wherein a coefficient of thermal expansion of the bearing housing portion is greater than a coefficient of thermal expansion of the outer race of the bearing.

9. The rotating electric machine according to claim 8, wherein a coefficient of thermal expansion of the clearance filling member is greater than the coefficient of thermal expansion of the bearing housing.

* * * * *